(12) United States Patent
Nakamoto et al.

(10) Patent No.: US 12,138,726 B2
(45) Date of Patent: Nov. 12, 2024

(54) METHOD AND DEVICE FOR DETERMINING PROCESSING CONDITION

(71) Applicant: MAKINO MILLING MACHINE CO., LTD., Tokyo (JP)

(72) Inventors: Keiichi Nakamoto, Tokyo (JP); Mayu Hashimoto, Tokyo (JP); Takashi Ogawa, Tokyo (JP); Shinji Igari, Kanagawa (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 339 days.

(21) Appl. No.: 17/636,632

(22) PCT Filed: Jul. 22, 2020

(86) PCT No.: PCT/JP2020/028556
§ 371 (c)(1),
(2) Date: Feb. 18, 2022

(87) PCT Pub. No.: WO2021/033490
PCT Pub. Date: Feb. 25, 2021

(65) Prior Publication Data
US 2022/0281047 A1 Sep. 8, 2022

(30) Foreign Application Priority Data
Aug. 19, 2019 (JP) ................................. 2019-149726

(51) Int. Cl.
*B23Q 17/20* (2006.01)
*G05B 19/406* (2006.01)

(52) U.S. Cl.
CPC .......... *B23Q 17/20* (2013.01); *G05B 19/406* (2013.01); *G05B 2219/35529* (2013.01)

(58) Field of Classification Search
CPC ...... B23Q 17/20; B23Q 15/00; G05B 19/406; G05B 2219/35529; G05B 19/4097; G05B 19/4093; G05B 19/4155; Y02P 90/02
See application file for complete search history.

(56) References Cited

U.S. PATENT DOCUMENTS

| | | | |
|---|---|---|---|
| 6,867,774 B1* | 3/2005 | Halmshaw | G06T 15/08 345/424 |
| 2001/0001440 A1* | 5/2001 | Wei | B23H 3/00 205/640 |

(Continued)

FOREIGN PATENT DOCUMENTS

| | | |
|---|---|---|
| JP | 2002-189510 A | 7/2002 |
| JP | 2014-160303 A | 9/2014 |

OTHER PUBLICATIONS

Yousefian et al. "Point-by-point prediction of cutting force in 3-axis CNC milling machines through voxel framework in digital manufacturing", Journal of Intelligent Manufacturing, Springer US, New York, vol. 31, No. 1: 215-226 (2018).

(Continued)

*Primary Examiner* — Kidest Bahta
(74) *Attorney, Agent, or Firm* — Merchant & Gould P.C.

(57) ABSTRACT

A method is provided with a step of converting shape data (51) into a plurality of voxels (55) for each of a plurality of known objects being processed, a step of setting, for each of the known objects being processed, a processing condition for a voxel (55) constituting a processing surface, a step of using the voxel (55) of the plurality of known objects being processed and the processing condition to perform machine learning in which an input is the voxel (55) and an output is a processing condition, a step of converting shape data (52) of a candidate object being processed into a plurality of voxels (56), a step of setting, on the basis of results of machine learning, a processing condition for a voxel (56) constituting a processing surface of the candidate object being processed, and a step of determining a processing condition for each processing surface of the candidate object being processed, a processing condition that is set for the largest number of voxels (56) in one processing surface (Continued)

being determined as a processing condition for said processing surface.

5 Claims, 8 Drawing Sheets

(56) References Cited

U.S. PATENT DOCUMENTS

| | | | |
|---|---|---|---|
| 2002/0082742 A1 | 6/2002 | Kadono | |
| 2003/0208296 A1* | 11/2003 | Brisson | A61B 34/20 700/117 |
| 2018/0181108 A1* | 6/2018 | Nagano | G05B 19/182 |

OTHER PUBLICATIONS

Codjo et al. "Honeycomb Core Milling Diagnosis using Machine Learning in the Industry 4.0 Framework", 2018 IEEE 23rd International Conference on Emerging Technologies and Factory Automation (ETFA), IEEE, vol. 1: 1251-1258 (2018).
Balic et al. "Intelligent tool path generation for milling of free surfaces using neural networks", International Journal of Machine Tools and Manufacture, vol. 42, No. 10: 1171-1179 (2002).
Balabokhin et al. "Automatic generalized cutter selection for finishing of free-form surfaces in 3-axis CNC milling by "surface tolerance and tool performance metrics"", The International Journal of Advanced Manufacturing Technology, Springer, London, vol. 93, No. 1: 423-432 (2017).

* cited by examiner

FIG. 6
(a)
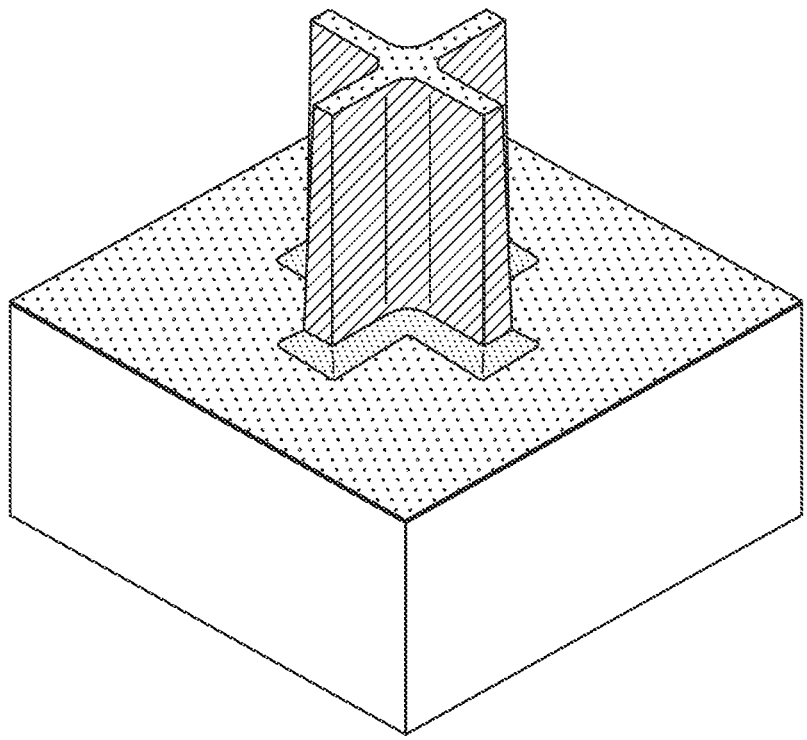
MODEL A
(b)
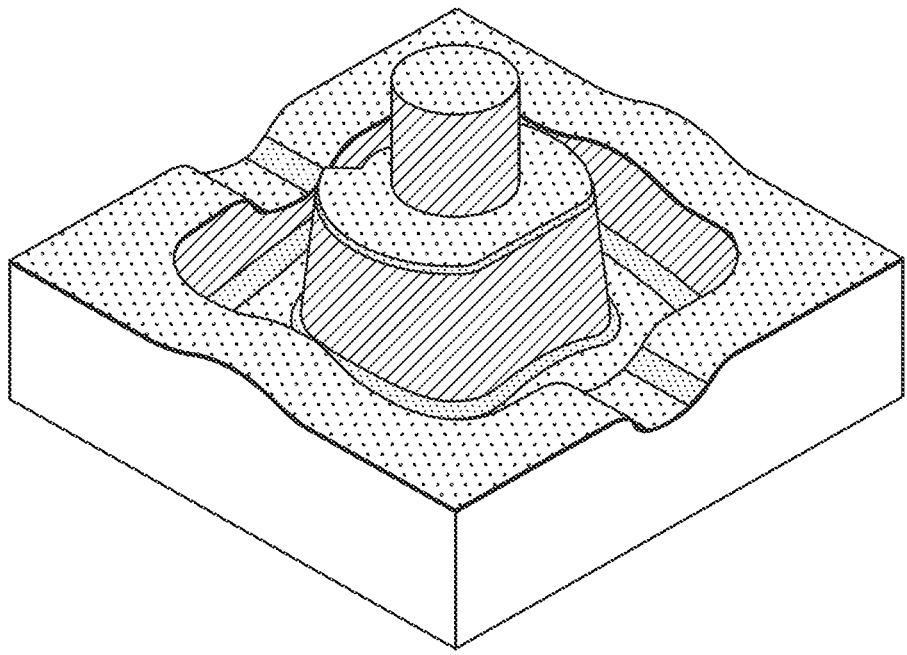
MODEL B

FIG. 7
(a)
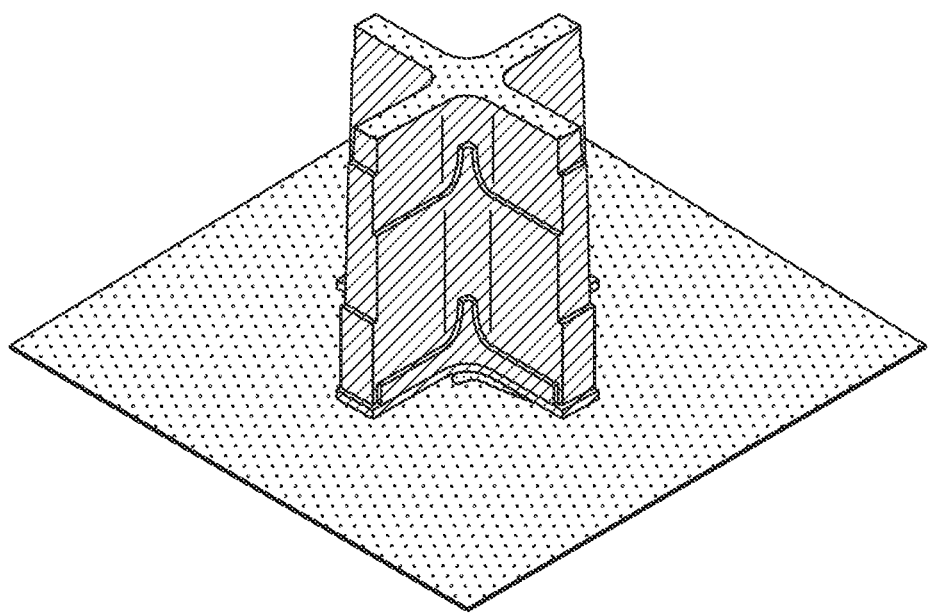
MODEL A
(b)
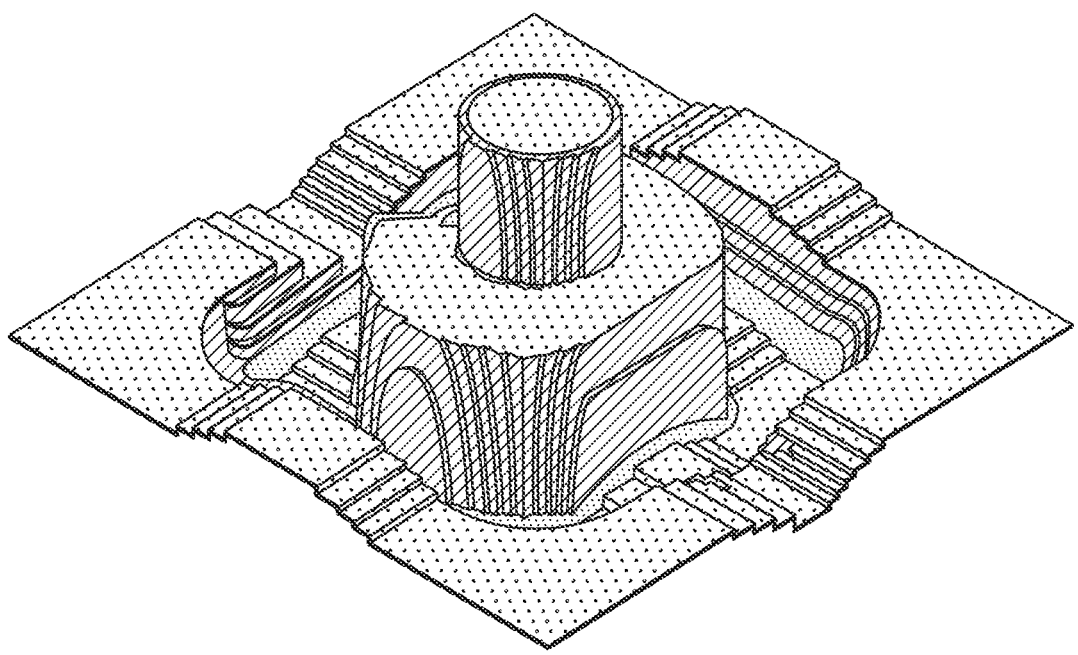
MODEL B

FIG. 8
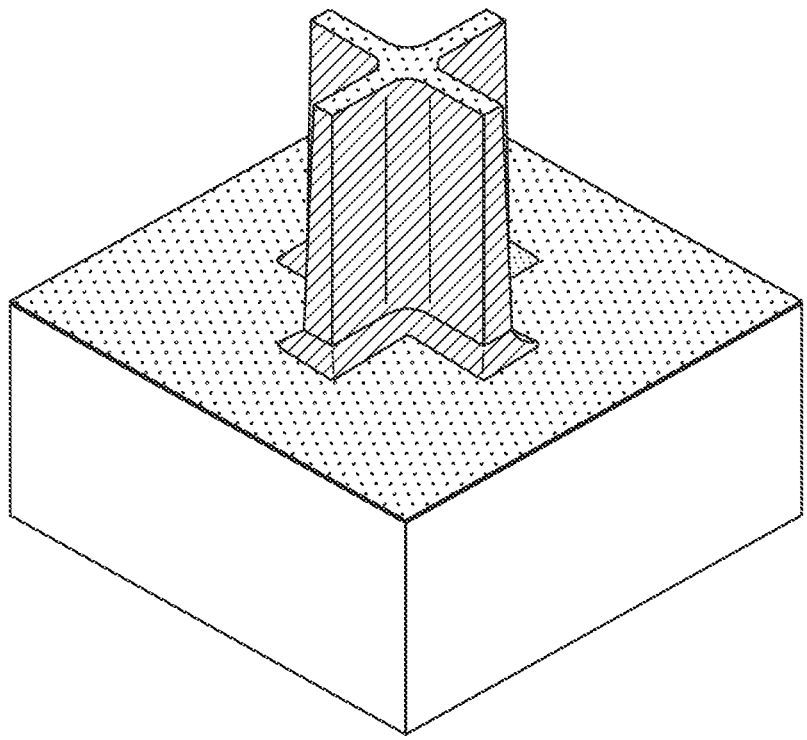
MODEL A
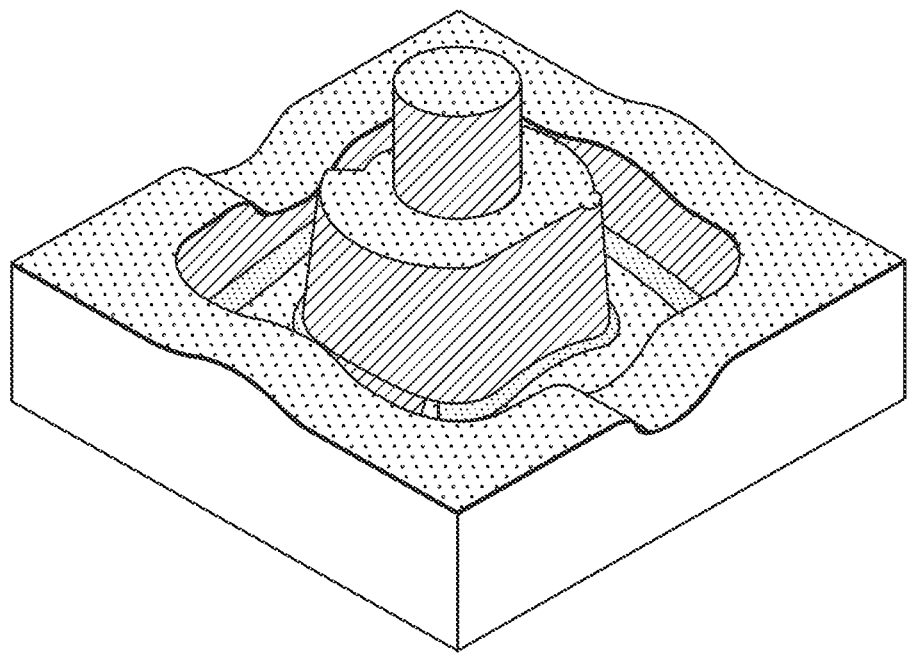
MODEL B

METHOD AND DEVICE FOR DETERMINING PROCESSING CONDITION

This application is a National Stage Application of PCT/JP2020/028556 filed Jul. 22, 2020, which claims benefit of priority to Japanese Patent Application No. 2019-149726, filed Aug. 19, 2019, which applications are incorporated herein by reference. To the extent appropriate, a claim of priority is made to each of the above disclosed applications.

FIELD

The present disclosure relates to a method and a device for determining a machining condition.

BACKGROUND

Conventionally, various technologies for supporting NC (Numerical Control) machining have been proposed. For example, Patent Literature 1 discloses a method and a device for supporting mold design using NC data. In Patent Literature 1, during design of a mold using NC data of an existing mold, the CAM data of an existing mold and the CAM data of the mold to be designed are compared, and it is determined whether or not it is possible to use the data of the existing mold for each machining location. The ratio of the number of machined locations for which the data of the existing mold can be used to the total number of to be machined locations is calculated as a diversion rate. A neural network is used to calculate the diversion rate.

Patent Literature 2 discloses a device for supporting the generation of tool path data in an NC machine tool. In Patent Literature 2, the tool path data is automatically generated based on feature data regarding the three-dimensional shape of the product, material data, data of each machining step, data regarding shape after each machining step, and data of usable tools.

CITATION LIST

Patent Literature

[PTL 1] Japanese Unexamined Patent Publication (Kokai) No. 2014-160303
[PTL 2] Japanese Unexamined Patent Publication (Kokai) No. 2002-189510

SUMMARY

Technical Problem

Machining conditions in NC machining are sometimes generated by inputting various data to CAM software based on operator experience and know-how. However, when the operator is inexperienced, it is difficult to determine the desired machining conditions, in particular, when the workpiece has a complex shape.

The present invention aims to provide a method and device with which machining conditions can be newly determined for a workpiece having no existing patterns based on a plurality of example cases.

Solution to Problem

One aspect of the present disclosure provides a method for determining a machining condition in NC machining, the method comprising the steps of converting shape data of each of a plurality of known workpieces each having a plurality of machined surfaces into a plurality of voxels, setting a machining condition for each of the voxels constituting the machined surfaces for each of the plurality of known workpieces, performing machine learning in which the input is voxels and the output is a machining condition using the voxels of the plurality of known workpieces and the machining condition, converting shape data of a target workpiece having a plurality of surfaces to be machined to a plurality of voxels, setting a machining condition for each of the voxels constituting the surfaces to be machined of the target workpiece using the voxels of the target workpiece as input based on results of the machine learning, and determining a machining condition for each of the surfaces to be machined of the target workpiece, wherein the machining condition set for the largest number of voxels in one surface to be machined is set as the machining condition of the surface to be machined.

In the method according to the aspect of the present disclosure, the shape data of known workpieces is converted to a plurality of voxels. Furthermore, a machining condition is set for each of the voxels constituting the surfaces to be machined. These machining conditions can be preset for each of the surfaces to be machined by, for example, a skilled operator. Based on a plurality of known workpiece voxels and machining conditions, machine learning in which the input is voxels and the output is machining conditions is performed. Based on the results of this machine learning, a machining condition is newly determined automatically for each of the surfaces to be machined of the target workpiece. Thus, for target workpieces having no existing patterns, the machining condition can be determined based on a plurality of example cases.

The machining conditions may include a tool path pattern, and the method may further comprise the step of generating an overall tool path for machining the target workpiece based on the tool path pattern determined for each of the surfaces to be machined of the target workpiece. In this case, the overall tool path for the target workpiece can be automatically determined.

There may further be provided the steps of setting a surface quality for each of the voxels constituting the machined surfaces for each of the plurality of known workpieces, and setting a surface quality for each of the voxels constituting the surfaces to be machined for the target workpiece, and the step of performing machine learning and the step of setting a machining condition for the voxels of the target workpiece may further use the surface quality as input. In the same manner as workpiece shape (voxel shape), the surface quality can influence the choice of machining conditions. Thus, by further using surface quality as an input for machine learning, the machining condition can be determined with higher accuracy.

The machining condition may include a tool to be used in machining. In this case, the tool to be used in machining can automatically be determined for each surface to be machined of the target workpiece.

Another aspect of the present disclosure provides a device for determining a machining condition in NC machining, the device comprising a processor, and a display unit, wherein the processor is configured so as to execute the steps of converting shape data of each of a plurality of known workpieces each having a plurality of machined surfaces into a plurality of voxels, setting a machining condition for each of the voxels constituting the machined surfaces for each of the plurality of known workpieces, performing machine learning in which the input is voxels and the output is a machining condition using the voxels of the plurality of known workpieces and the machining condition, converting shape data of a target workpiece having a plurality of surfaces to be machined to a plurality of voxels, setting a machining condition for each of the voxels constituting the surfaces to be machined of the target workpiece using the voxels of the target workpiece as input based on results of the machine learning, and determining a machining condition for each of the surfaces to be machined of the target workpiece, wherein the machining condition set for the largest number of voxels in one surface to be machined is set as the machining condition of the surface to be machined, each of the machining conditions is assigned a predetermined feature that can be visually identified, the processor recognizes the machining conditions as the predetermined features, and the display unit displays each of the surfaces to be machined of the target workpiece together with the predetermined features corresponding to the determined machining conditions.

In the device according to this aspect, in the same manner as the method described above, for target workpieces having no existing pattern, the machining condition can be newly determined based on multiple example cases. Furthermore, in this device, the machining condition determined for each of the surfaces to be machined is displayed on the display unit as a predetermined feature which can be visually identified. Thus, the operator can easily recognize the machining condition determined for each of the surfaces to be machined.

Advantageous Effects of Invention

According to the aspect of the present disclosure, there can be provided a method and device with which machining conditions can be newly determined for a workpiece having no existing patterns based on a plurality of example cases.

BRIEF DESCRIPTION OF DRAWINGS

FIG. 6(a) shows CAD data of a model A of an existing process design example case.
FIG. 6(b) shows CAD data of a model B of an existing process design example case.
FIG. 7(a) shows voxels of model A for which machining conditions are set by the method of the present disclosure.
FIG. 7(b) shows voxels of model B for which machining conditions are set by the method of the present disclosure.
FIG. 8(a) shows CAD data of model A for which machining conditions are set by the method of the present disclosure.
FIG. 8(b) shows CAD data of model B for which machining conditions are set by the method of the present disclosure.

DESCRIPTION OF EMBODIMENTS

The method and device for determining machining conditions in NC machining according to the embodiments will be described below with reference to the attached drawings. Identical or corresponding elements have been assigned the same reference sign, and duplicate descriptions thereof have been omitted.

Figure 1:
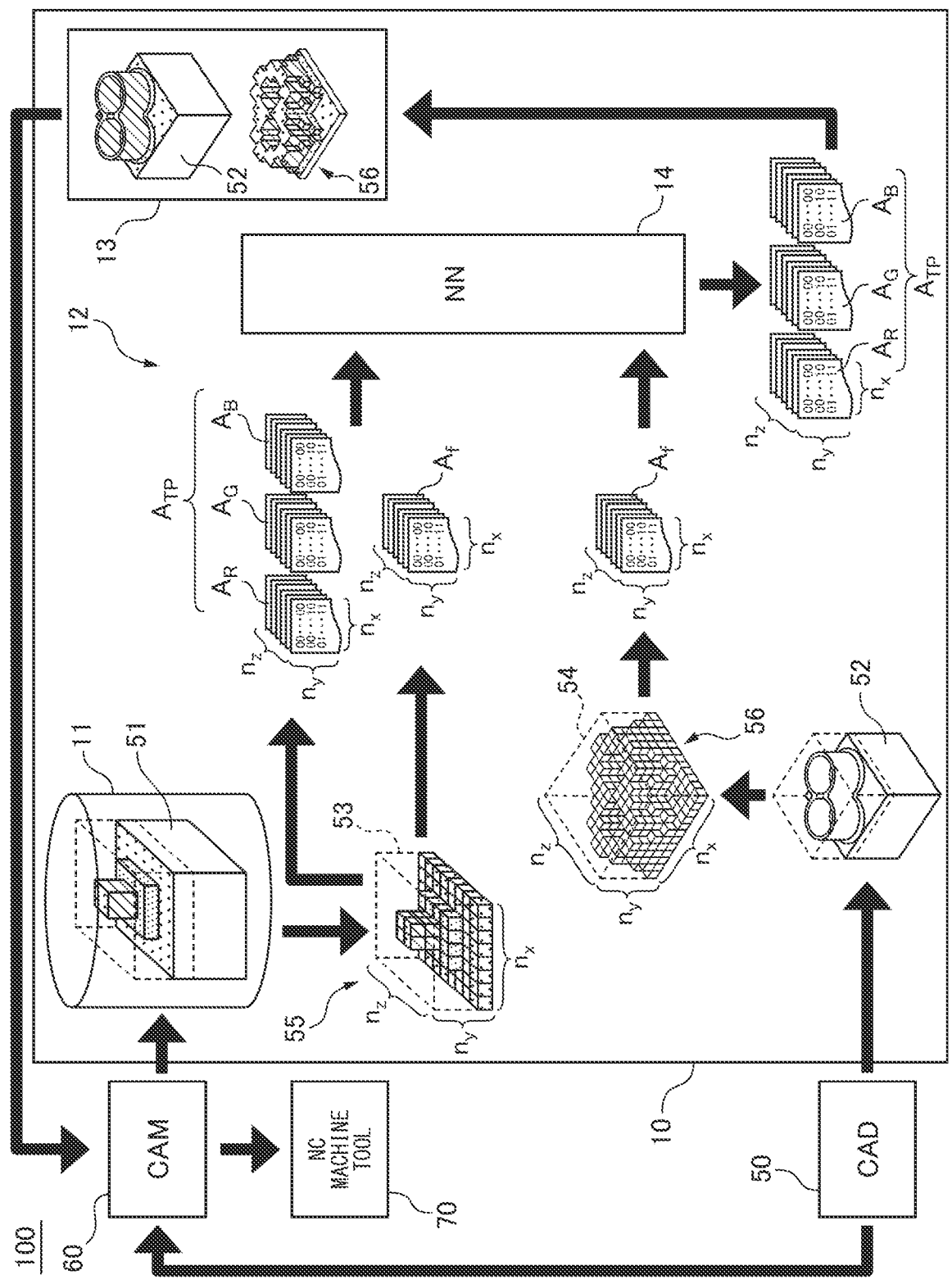
FIG. 1 is a schematic view showing a method and device according to an embodiment.

FIG. 1 is a schematic view showing the method and device according to an embodiment. The method of the present disclosure can be executed in system 100 comprising a CAD (Computer Aided Design) system 50, CAM (Computer Aided Manufacture) system 60, a device 10 for determining a machining condition, and a machine tool 70. The system 100 may comprise other constituent elements. The CAD system 50, CAM system 60, and device 10 may be configured as separate devices, or may be incorporated in the same device (for example, the device 10 may be incorporated in the CAM system 60. Furthermore, for example, CAD software and CAM software may be incorporated in the device 10).

In the CAD system 50, CAD data of a workpiece is created. The workpiece can be any of various products (for example a mold or the like). The workpiece represented by CAD data has a target shape after being machined by a tool. In the CAD system 50, CAD data 51 of "known workpieces" (hereinafter also may be referred to as "teacher data") serving as teacher data when the device 10 performs machine learning and CAD data 52 of the "target workpiece" for which a new machining condition is determined based on results of the machine learning are created. Note that the "known workpiece (teacher data)" may be a workpiece actually created in the past or alternatively, may be a workpiece which was created only as electronic data and for which the machining condition is determined by a skilled operator.

The CAD data 51, 52 includes shape data such as vertexes, edges, and surfaces included on the workpiece. The CAD data 51, 52 can be defined in, for example, the XYZ coordinate system, which is a three-dimensional Cartesian coordinate system. The CAD data 51, 52 may be defined in another coordinate system. The workpiece includes a plurality of surfaces to be machined which are surrounded (or separated) by character lines.

The CAD data 51 of the teacher data is input to the CAM system 60. In the CAM system 60, an operator (in particular, a skilled operator) sets a machining condition for each of the plurality of surfaces to be machined of the teacher data. The machining condition can be various information related to machining. For example, the machining condition can include the tool path pattern, dimensions of the tool (for example, diameter, protrusion length from the holder, etc.), cutting conditions (rotational speed, feed rate, cutting depth, etc., of the tool), the number of tools, machining area per tool, tool type, etc. For example, the operator can select, from among a plurality of choices prepared for a certain machining condition, the machining condition used in an actual prior machining for the machined surfaces thereof or a machining condition considered suitable in the machining of the machined surfaces thereof. In the present embodiment, the machining condition used in the machine learning (the machining condition newly set for the target workpiece) is described as a tool path pattern. The operator can select, for example, from among a plurality of tool path patterns, the tool path pattern used in actual prior machining for the machined surfaces thereof or a tool path pattern considered suitable in the machining of the machined surfaces thereof. By combining a plurality of tool path patterns selected for a plurality of machined surfaces, an overall tool path of a single workpiece is generated.

Figure 2:
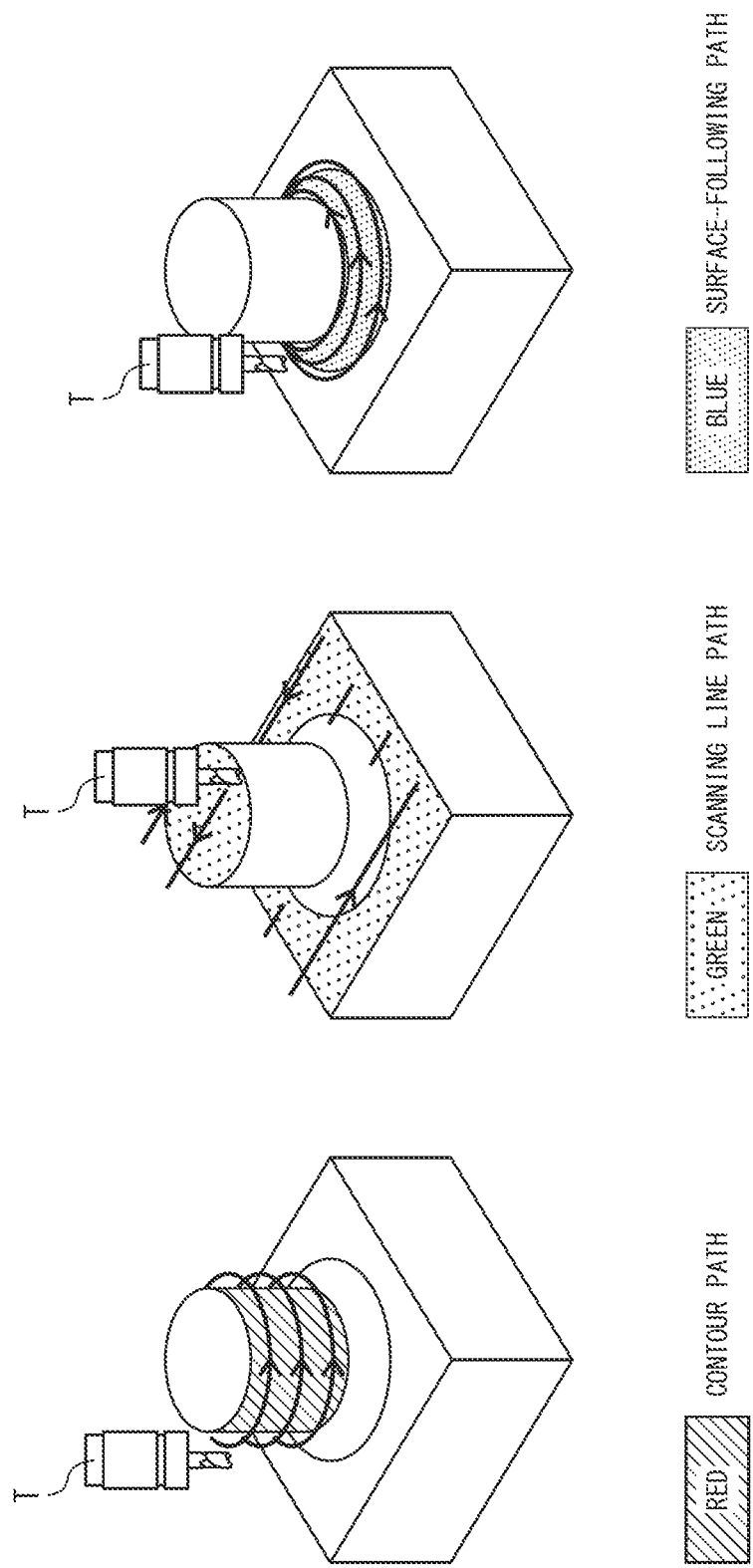
FIG. 2 is a schematic view showing various tool path patterns as examples of machining conditions.

FIG. 2 is a schematic view showing various tool path patterns as examples of machining conditions. The plurality of tool path patterns can include various tool path patterns. For example, the drawing on the left side of FIG. 2 shows a contour path. In the contour path, the tool T machines the surface to be machined with a contour line operation. The center drawing of FIG. 2 shows a scanning line path. In the scanning line path, the tool T machines the to be machined surface so as to fill the area while imitating the machined surface. The drawing on the right side of FIG. 2 shows a surface-following path. In the surface-following path, the tool T machines the surface to be machined by an operation which follows the boundary lines of the surface to be machined. The plurality of tool path patterns may include tool path patterns other than the three tool path patterns described above (for example, spiral machining in which the machined surface is machined while the tool moves spirally in the height direction).

Each of the plurality of options is assigned a predetermined color so that it is possible to visually identify which machining condition is selected for the surface to be machined. As shown in FIG. 2, for example, in the present embodiment, "red" is assigned to surfaces to be machined for which the contour path is selected, "green" is assigned to surfaces to be machined for which a scanning line path is selected, and "blue" is assigned to surfaces to be machined for which a surface-following path is selected. The display unit of the CAM system 60 displays each of the surfaces to be machined in a predetermined color corresponding to the selected machining condition. This enables the operator to easily recognize which machining condition has been selected for the surface to be machined. In order to be able to visually identify which machining condition was selected for a surface to be machined, each of the plurality of options can be assigned a predetermined visually identifiable feature (for example, color, pattern, and/or text, etc.).

Referring to FIG. 1, the teacher data is input from the CAM system 60 to the device 10. The teacher data includes the CAD data 51 created by the CAD system 50 and the machining conditions set by the CAM system 60. In the present embodiment, the tool path patterns are included in the teacher data as the color assigned to that tool path pattern.

The device 10 can comprise, for example, a storage device 11, a processor 12, and a display unit 13, and these components are connected to each other via buses (not illustrated) or the like.

The device 10 may comprise other constituent elements such as ROM (read-only memory), a RAM (random access memory), and/or an input device (for example, a mouse, keyboard, and/or touch panel, etc.). The device 10 can be, for example, a computer, a server, a tablet, or the like.

The storage device 11 can be, for example, one or a plurality of hard disk drives. The storage device 11 can store the input teacher data. The processor can be 12, for example, one or a plurality of CPUs (Central Processing Units) or the like. The processor 12 is configured to execute the plurality of processes shown below, and a program for executing each process can be stored in, for example, a storage device 11. The processor 12 is configured to perform machine learning based on the information of a plurality of sets of teacher data stored in the storage device 11 (which will be described in detail later). For example, a neural network (for example, a convolutional neural network) can be used in the machine learning. Furthermore, the processor 12 is configured to newly determine the machining condition for the target workpiece based on the result of the machine learning described above using the target workpiece CAD data 52 created by the CAD system 50 (which will be described in detail later).

The display unit 13 may be a liquid crystal display and/or a touch panel or the like. In the same manner as the display unit of the CAM system 60, the display unit 13 displays each of the surfaces to be machined along with predetermined visually identifiable features (for example, colors, patterns, and/or characters, etc.) corresponding to the set machining condition.

The data of the machining condition of the target workpiece determined by the device 10 is input to the CAM system 60. The data input to the CAM system 60 can be converted into NC data and input to the NC machine tool 70.

Next, the operations executed by the device 10 will be described.

Figure 3:
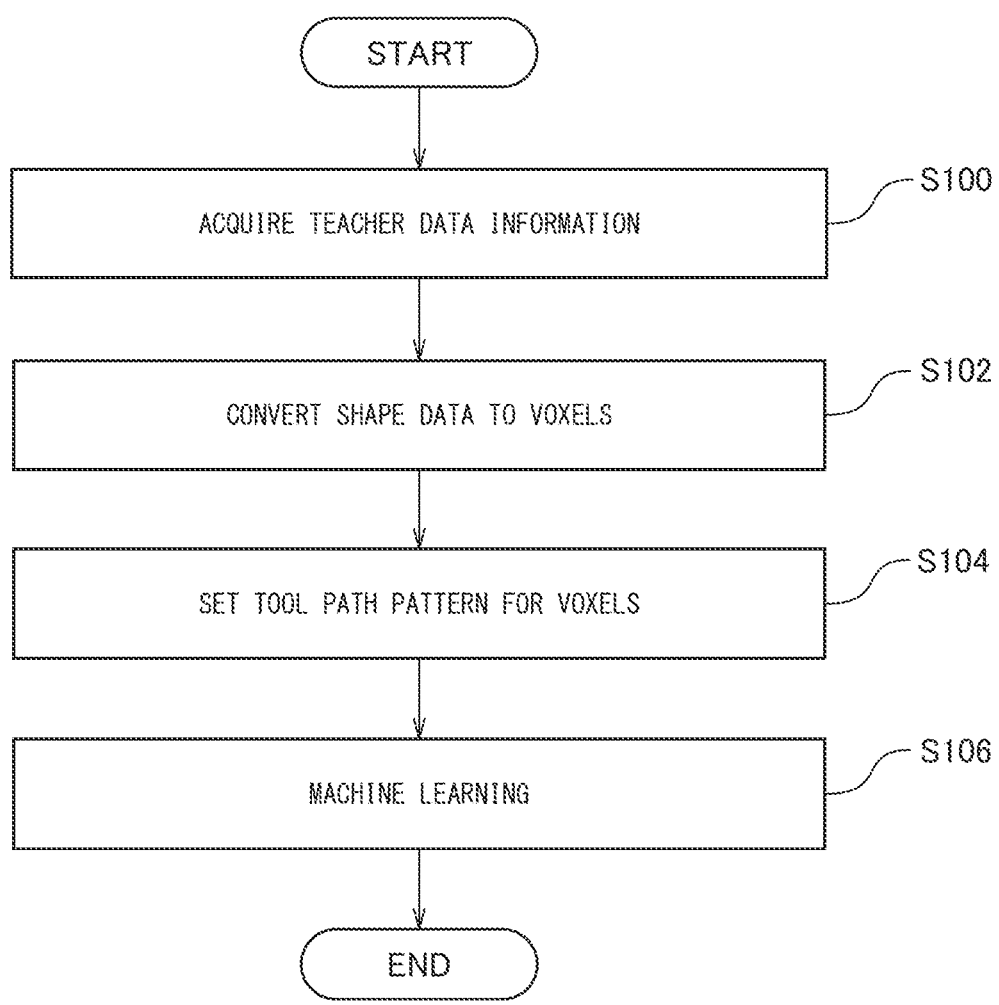
FIG. 3 is a flowchart showing machine learning executed by the device of FIG. 1.

First, the machine learning executed by the device 10 will be described. FIG. 3 is a flowchart showing the machine learning executed by the device of FIG. 1.

The processor 12 acquires information regarding each of the plurality of sets of teacher data from the storage device 11 (step S100). The information to be acquired includes the CAD data 51 and a machining condition (tool path pattern (color)) selected for each of the plurality of surfaces to be machined.

Next, the processor 12 converts the CAD data (shape data) 51 regarding each of the plurality of sets of teacher data to a plurality of voxels (step S102). Specifically, referring to FIG. 1, the processor 12 sets a region 53 including all of the surfaces to be machined in the CAD data 51 based on the program and/or input from the operator. The region 53 can also include spaces in which the material of the workpiece is not present. The region 53 can have a three-dimensional shape such as a cubic shape or a rectangular parallelepiped shape. The processor 12 generates $n_x \times n_y \times n_z$ voxels 55 by dividing the region 53 into $n_x$ divisions in the X direction, $n_y$ divisions in the Y direction, and $n_z$ divisions in the Z direction based on, for example, the program and/or input from the operator. For example, the processor 12 sets "1" for voxels 55 which contain the material of the workpiece (voxels filled with material) and "0" for voxels 55 which do not contain the material of the workpiece (which can also be referred to as "filling degree" in the present disclosure). By these operations, the filling degree array $A_f$ of $n_x \times n_y \times n_z$ is generated. The number of divisions $n_x \times n_y \times n_z$ is the same among the plurality of sets of teacher data. When the number of divisions $n_x \times n_y \times n_z$ is different for each set of teacher data, they are converted to the same number of divisions in advance by enlarging/reducing the side length of each voxel while maintaining the scale of shape data, dividing one voxel into a plurality of voxels, or filling the outer region of workpiece with "0" voxels.

Referring to FIG. 3, next, the processor 12 sets a machining condition (tool path pattern (color)) for each of the voxels 55 constituting the to be machined surfaces for each of the plurality of sets of teacher data (step S104). Specifically, referring to FIG. 1, for example, the processor 12 can set a color preset for each surface to be machined by a skilled operator in the CAM system 60 for voxels 55 included in the surface to be machined. The processor 12 generates arrays $A_R$, $A_G$, and $A_B$ for each color. Specifically, in the array $A_R$, "1" is set for voxels 55 for which red is set, and "0" is set for other voxels 55. Similarly, in the array $A_G$, "1" is set for voxels 55 for which green is set, and "0" is set for other voxels 55. In the array $A_B$, "1" is set for voxels 55 for which blue is set, and "0" is set for other voxels 55. By these operations, a tool path pattern array $A_{TP}$ including the three arrays $A_R$, $A_G$, and $A_B$ of $n_x \times n_y \times n_z$ is generated. Note that some voxels 55 (for example, voxels located at the edges) may belong to a plurality of surfaces to be machined. For such voxels 55, different tool path patterns (colors) may be set (for example, in region 53, green (top) and red (side) can be set for the top voxel). For such voxel 55, "1" is set in the array $A_G$, and "1" is set in the array $A_R$ as well.

Referring to FIG. 3, next, the processor 12 performs machine learning in which the input is the voxels and the output is the machining condition using the voxels of the plurality of sets of teacher data and the machining conditions (step S106). Specifically, referring to FIG. 1, the processor 12 performs machine learning with the filling degree array $A_f$ as input and the tool path pattern array $A_{TP}$ as output. As a result, a trained network 14 is obtained. For example, a neural network (NN) can be used in the machine learning. In some embodiments, a neural network which can be applied to segmentation can be used. Furthermore, in some embodiments, a convolutional neural network (CNN) can be used.

As a result of the foregoing, the series of operations related to machine learning executed by the device 10 is completed. The above steps may be repeated until a desired convergence result is obtained.

Figure 4:
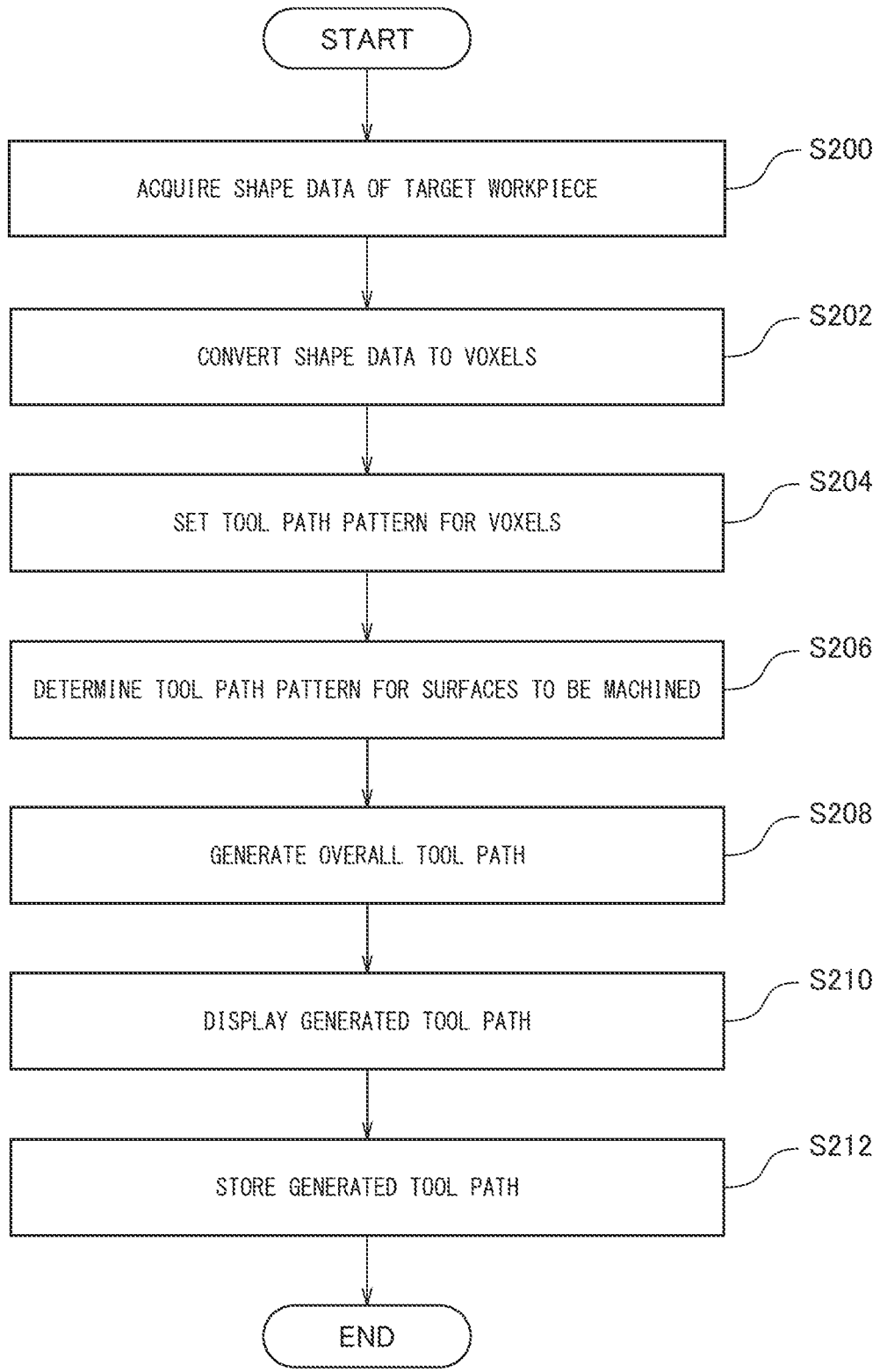
FIG. 4 is a flowchart showing the determination of machining conditions for a target workpiece executed by the device of FIG. 1.

Next, the determination of the machining condition for the new target workpiece executed by the device 10 will be described. FIG. 4 is a flowchart showing the determination of the machining condition for the target workpiece executed by the device of FIG. 1.

The processor 12 acquires the shape data of the target workpiece (step S200). Specifically, referring to FIG. 1, the processor 12 acquires the target workpiece CAD data 52 created by the CAD system 50. The acquired CAD data includes the shape data of the target workpiece.

Referring to FIG. 4, next, the processor 12 converts the shape data of the target workpiece into a plurality of voxels 56 (step S202). Specifically, referring to FIG. 1, the processor 12 sets a region 54 containing all of the surfaces to be machined in the CAD data 52 based on the program and/or input from the operator. In the same manner as the region 53 described above, the region 54 can include spaces in which the workpiece is not present, and can have a three-dimensional shape such as a cubic shape or a rectangular parallelepiped shape. In the same manner as the region 53 described above, the processor 12 generates $n_x \times n_y \times n_z$ voxels 56 by dividing the region 54 into $n_x$ divisions in the X direction, $n_y$ divisions in the Y direction, and $n_z$ divisions in the Z direction. In the same manner as the region 53 described above, the processor 12 sets "1" for voxels 56 which contain the material of the workpiece and "0" for voxels 56 which do not contain the material of the workpiece, whereby the filling degree array $A_f$ of $n_x \times n_y \times n_z$ is generated. The number of divisions $n_x \times n_y \times n_z$ of the target workpiece is the same as the number of divisions $n_x \times n_y \times n_z$ of the teacher data. If the number of divisions of the target workpiece $n_x \times n_y \times n_z$ is different from the number of divisions of teacher data $n_x \times n_y \times n_z$, they are converted to the same number of divisions in advance by enlarging/reducing the side length of each voxel while maintaining the scale of shape data, dividing one voxel into a plurality of voxels, or filling the outer region of workpiece with "0" voxels.

Referring to FIG. 4, next, the processor 12 sets a machining condition (tool path pattern (color)) for each of the voxels 56 constituting the to be machined surfaces of the target workpiece based on the results of the machine learning described above (step S204). Specifically, referring to FIG. 1, the processor 12 inputs the filling degree array $A_f$ of the target workpiece into the trained network 14, thereby generating the tool path pattern array $A_{TP}$ for the target workpiece. The tool path pattern array $A_{TP}$ contains the three arrays $A_R$, $A_G$, $A_B$ for each color.

Referring to FIG. 4, next, the processor 12 determines the color for each of the surfaces to be machined of the target workpiece (step S206). Specifically, the processor 12 determines the color set for the largest number of voxels 56 among a single surface to be machined as the color of the surface to be machined using the results obtained in step S204. As described above, for some voxels 56 (for example, voxels located at the edges), a plurality of tool path patterns (colors) may be set for a single voxel 56. By the above operation, when determining the machining condition for a certain surface to be machined, the influence from the periphery of the machined surface can be taken into consideration.

Next, the processor 12 generates an overall tool path for machining the target workpiece based on the tool path pattern determined for each of the surfaces to be machined of the target workpiece (step S208). For example, the processor 12 combines the individual tool path patterns determined for each of the surfaces to be machined to generate the overall tool path. The processor 12 transmits the generated tool path to the display unit 13.

Next, the display unit 13 displays the generated tool path of the target workpiece (step S210). Specifically, referring to FIG. 1, the display unit 13 displays each of the surfaces to be machined of the target workpiece CAD data 52 in the color determined in step S206. The display unit 13 may also display each of the target workpiece voxels 56 in the color set in step S204.

Next, referring to FIG. 4, the processor 12 saves the generated tool path of the target workpiece in the storage device 11 (step S212), and the series of operations ends. In subsequent machine learning, the new tool path saved in the storage device 11 may be used as one of the sets of teacher data. Furthermore, the generated tool path may be transmitted to the CAM system 60, or may be used in actual machining with the machine tool 70 after being converted into NC data by the CAM system 60.

In the method and device 10 according to the embodiment as described above, the known workpiece CAD data 51 is converted to a plurality of voxels 55. Furthermore, a machining condition is set for each of the voxels 55 constituting the surface to be machined. This machining condition can be preset for each of the surfaces to be machined by, for example, a skilled operator. Further, based on a plurality of known workpiece voxels 55 and the machining conditions, machine learning in which the input is the voxels 55 and the output is the machining condition is performed. Based on the result of this machine learning, the machining condition is newly determined automatically for each of the surfaces to be machined of the target workpiece. Therefore, for target workpieces having no existing patterns, it is possible to newly determine the machining condition based on a plurality of example cases.

Furthermore, in the method and device 10 according to the embodiment, the machining condition includes a tool path pattern, and the method further comprises a step of generating an overall tool path for machining the target workpiece based on the tool path pattern determined for each of the surface to be machined of the target workpiece. Thus, an overall tool path can be automatically determined for the target workpiece.

Furthermore, in the method and device 10 according to the embodiment, the machining condition determined for each of the surfaces to be machined is displayed on the display unit 13 as a predetermined feature with which the machining condition can be visually identified. Thus, the operator can easily identify the machining condition determined for each of the surfaces to be machined.

Though embodiments of the method and device for determining a machining condition in NC machining have been described, the present invention is not limited to the embodiments described above. A person skilled in the art could understand that various changes can be made to the embodiments described above. Furthermore, a person skilled in the art could understand that the method described above need not be executed in the order described above, but can be executed in other orders as long as contradictions are not brought about thereby.

For example, referring to FIG. 1, in the network 14 of the embodiments described above, voxels (the voxel filling degree array $A_f$) is used as input. However, in other embodiments, additional information may be used as input. For example, "surface quality" may further be used as input. The surface quality can be preset in the CAD system 50 or CAM system 60 by, for example, the operator. The device 10 is configured so as to further execute a step of setting the surface quality for each of the voxels constituting the machined surfaces for each of the plurality of known workpieces, and a step of setting a surface quality for each of the voxels constituting the surfaces to be machined for the target workpiece. Specifically, the processor 12 can set the surface quality for the voxels contained in the machined surface using those preset in the CAD system 50 or the CAM system 60 for each of the machined and to-be-machined surfaces for both the known workpieces and the target workpiece. For example, the surface quality can be set to "0" as low quality and "1" as high quality. Furthermore, for example, the surface quality may be a value of surface roughness. In the same manner as the shape of the workpiece (the shape of the voxels), the surface quality can influence the choice of machining condition. Thus, by further using the surface quality as input, the machining condition can be determined with higher accuracy. Additionally or alternatively, the device 10 may use various machined surface parameters (for example, dimensional accuracy, geometric accuracy, etc.) other than surface quality for input.

Furthermore, in the network 14 of the embodiments described above, the tool path pattern (tool path pattern array $A_{TP}$) is used as output (machining condition). However, in other embodiments, other information may additionally or alternatively be used as output (machining condition). For example, the "tool used for machining" may be used as the machining condition.

The tool used for machining can be preset for the known workpieces in the CAM system 60 by, for example, the operator. The processor 12 can set a tool preset in the CAM system 60 for each machined surface for the voxels included in the machined surface. For example, the tool can be set to "0" for small diameter tools and can be set to "1" for large diameter tools. Furthermore, for example, the value of the tool diameter may be set for each voxel. Additionally or alternatively, the device 10 may use other various parameters related to machining (for example, the protrusion length from the tool holder, cutting conditions (tool rotation speed, feed rate, cutting depth, etc.), number of tools, machining area per tool, tool type, etc.) other than tool diameter in the machining condition.

For example, in the embodiments described above, a neural network is used in the machine learning. However, in other embodiments, other methods (for example, a decision tree, etc.) may be used in the machine learning.

EXAMPLES

In the present embodiment, a network (3D U-net) based on a convolutional neural network is used in the machine learning. Regarding the details of this network, refer to, for example, Cicek, O., Abdulkadir, A., Lienkamp, S. S., Brox, T., and Ronneberger, O, "3d U-Net: Learning Dense Volumetric Segmentation from Sparse Annotation", arXiv: 1606.06650, 2016.

Figure 5:
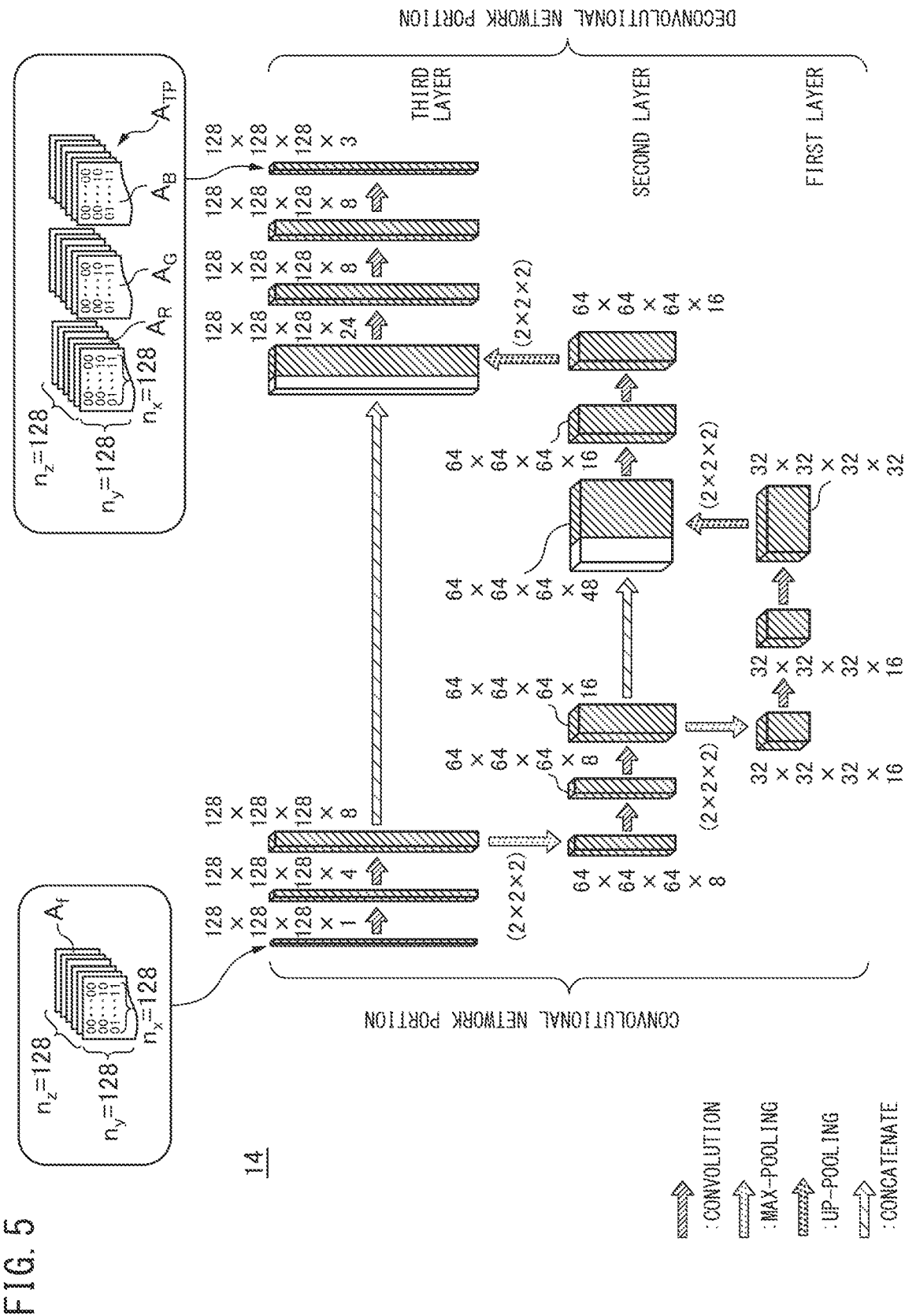
FIG. 5 is a schematic view showing a network structure.

FIG. 5 is a schematic view showing a network structure. Note that though a three-layer network 14 is shown in FIG. 5 to clarify the drawing, in the actual examples, a five-layer network is used. The network 14 has a convolutional network portion and a deconvolutional network portion. As shown in FIG. 5, the filling degree array $A_f$ having the number of voxels $n_x \times n_y \times n_z = 128 \times 128 \times 128$ is input to the network 14.

In the network 14 of FIG. 5, first, convolution is executed using four filters for the input filling degree array $A_f$ (128× 128×128×1). As a result, an array of 128×128×128 is obtained with 4 channels (128×128×128×4). Each convolution uses a filter with a size of 3×3×3. When convolution is performed on a voxel, an array of the same size as the filter centered on the voxel (3×3×3 array) is extracted from the filling degree array $A_f$. By multiplying the filling degree ("1" or "0") of each voxel (position) in the extracted array with the value of the corresponding position in the filter, a 3×3×3 product is obtained. The sum of these products is output for that voxel as a result of the convolution. The filter is then moved (stride) and this operation is performed on all voxels (positions) in the filling degree array $A_f$. In the network 14 of FIG. 5, the stride width of the convolution is 1. The above operation is executed for all filters. For the voxels at the ends, padding may be executed to set an arbitrary value (for example, "0") around the filling degree array $A_f$ in order to extract an array having the same size as the filter. The convolution extracts the local features of the target workpiece. The number of convolutions in each layer, as well as the number, size, and stride width of the filters used in the convolutions (also referred to as hyperparameters), are determined by the operator. Each value in the filter is adjusted by the machine learning.

After one or a plurality of convolutions have been performed, max-pooling is performed on the obtained array of each channel, thereby moving to the next layer (second layer). Each max-pooling uses a filter of size 2×2×2, which converts an array of 128×128×128 into an array of 64×64× 64. In max-pooling, an array of the same size as the filter (2×2×2 array) is extracted from the array of each channel. From the extracted array, the largest number is output as the result of the max-pooling. The filter is then moved (stride) and this operation is performed for all positions in the array and for all channels. In FIG. 5, the width of the max-pooling stride is 2×2×2. Max-pooling blurs the overall location of the features extracted by convolution. The size of the filter and the width of the stride used in max-pooling are determined by the operator.

By executing the above calculation for all layers, the convolutional network portion is completed. In FIG. 5, in the convolutional network portion, 32 channels of a 32×32×32 array are finally obtained (32×32×32×32). It should be noted that, as described above, in the actual embodiment, a 5-layer network is used, and 128 channels of an 8×8×8 array are ultimately obtained (not illustrated in FIG. 5).

In the deconvolutional network portion, up-pooling is performed on the array of each channel ultimately obtained in the convolutional network portion, and the array is moved to the previous layer (second layer). Each up-pooling uses a filter (2×2×2) of the same size as the max-pooling of the convolutional network portion. In FIG. 5, up-pooling converts an array of 32×32×32 into an array of 64×64×64. In up-pooling, one position is divided into an array of the same size as the filter (2×2×2 array). The value of the original position is output as a result of up-pooling at all the divided positions. This operation is performed for all positions in the array and for all channels. As a result, an array of 64×64×64×32 (not illustrated in FIG. 5) is obtained. In up-pooling, arrays having the same size as those of the previous layer (second layer) can be obtained while preserving the extracted features.

After the up-pooling is performed, concatenation is performed. In the concatenation, the array obtained by up-pooling (64×64×64×32) and the array ultimately obtained in the same layer of the convolutional network portion (64×64×64×16) are combined, whereby an array of 64×64×64×48 is obtained. In concatenation, the overall characteristics are restored.

After the concatenation has been performed, convolution is performed on the resulting array (64×64×64×48). In the convolution of the deconvolutional network portion, in the same manner as the convolution of the convolutional network portion, by making it possible to obtain the same number of channels by the number of filters determined by the operator, an array of 64×64×64×48 is converted into an array of 64×64×64×16.

By executing the above operations for all layers, the deconvolutional network portion is completed, and ultimately, a tool path pattern array $A_{TP}$ which contains the three arrays $A_R$, $A_G$, and $A_B$ for each color (each tool path pattern) is obtained.

In each convolution, a ReLU (Rectified Linear Unit) was used as the activation function, and Batch Normalization was executed prior to the ReLU. In the final convolution to generate the tool path pattern array $A_{TP}$, a filter with a size of 1×1×1 was used and the Sigmoid Function was used as the activation function. The dice function was used for the loss function, the mini-batch gradient descent method was used for the gradient descent method, and Adam was used for the optimization algorithm. The CAD software used to create the shape data of the workpiece was NX from Siemens, and API (Application Programming Interface) of NX and TensorFlow, a deep learning library from Google, were used for system development.

FIGS. 6(a) and (b) show CAD data of models A and B, respectively, of existing process design example cases. The models A and B of FIGS. 6(a) and (b) are used as the target workpiece. The models A and B of FIGS. 6(a) and (b) were not used as teacher data, but were used only as target workpieces. FIGS. 6(a) and (b) show the tool path pattern (color) applied by a skilled operator as correct. As teacher data, a 223 model from an existing process design example case was used (not illustrated). The tool paths for these models were also provided by the skilled operator.

FIGS. 7(a) and (b) show the voxels of models A and B, respectively, for which the machining condition was set by the method of the present disclosure. FIGS. 7(a) and (b) show voxels with a tool path pattern, which correspond to the results obtained in step S204 of FIG. 4. It can be understood that the voxel tool path patterns in FIGS. 7(a) and (b) generally match the tool path patterns in the CAD data in FIGS. 6(a) and (b), respectively. Specifically, in model A, the matching rate between the voxel tool path pattern shown in FIG. 7(a) and the tool path pattern applied by the skilled operator was 93.9%. In model B, the matching rate between the voxel tool path pattern shown in FIG. 7(b) and the tool path pattern applied by the skilled operator was 90.7%.

FIGS. 8(a) and (b) show CAD data of models A and B, respectively, for which the machining condition was set by the method of the present disclosure. FIGS. 8(a) and (b) show CAD data with a tool path pattern, which correspond to the results obtained in step S206 of FIG. 4. It can be understood that the tool path patterns of the CAD data of FIGS. 8(a) and (b) generally match the tool path patterns of the CAD data of FIGS. 6(a) and (b), respectively. Specifically, in model A, the matching rate between the tool path pattern of the CAD data in FIG. 8(a) and the tool path pattern applied by the skilled operator was 70.6%. Furthermore, in model B, the matching rate between the tool path pattern of the CAD data shown in FIG. 8(b) and the tool path pattern applied by the skilled operator was 90.5%. From the foregoing, it can be understood that the method and device of the present disclosure can generate a tool path which is substantially identical to the tool path of the data of the exiting process design example cases, and a tool path which takes into account the know-how and experience of a skilled operator can be generated.

REFERENCE SIGNS LIST 10 device
12 processor
13 display unit
51 known workpiece CAD data (shape data)
52 target workpiece CAD data (shape data)
55 known workpiece voxel
56 target workpiece voxel
70 NC machine tool

The invention claimed is:

1. A method for determining a machining condition in NC machining, the method comprising:
    converting shape data of each of a plurality of known workpieces each having a plurality of machined surfaces into a plurality of voxels,
    setting a machining condition for each of the voxels constituting the machined surfaces for each of the plurality of known workpieces, wherein a plurality of machining conditions, including tool path patterns, are set for each of the voxels which belong to a plurality of the machined surfaces,
    performing machine learning using the voxels of the plurality of known workpieces and the machining condition in which the input is the voxels and the output is the machining condition,
    converting shape data of a target workpiece having a plurality of surfaces to be machined to a plurality of voxels,
    setting a machining condition for each of the voxels constituting the surfaces to be machined of the target workpiece using the voxels of the target workpiece as input based on results of the machine learning, wherein a plurality of machining conditions, including tool path patterns, are set for each of the voxels which belong to a plurality of surfaces to be machined, and
    determining a machining condition for each of the surfaces to be machined of the target workpiece by determining one having the largest number of occurrences among the machining conditions set for the voxels included in each surface to be machined as the machining condition of the surface to be machined.

2. The method according to claim 1, wherein the machining condition includes a tool path pattern, and
    the method further comprises generating an overall tool path for machining the target workpiece based on the tool path pattern determined for each of the surfaces to be machined of the target workpiece.

3. The method according to claim 1, further comprising:
    setting a surface roughness for each of the voxels constituting the machined surfaces for each of the plurality of known workpieces, and
    setting a surface roughness for each of the voxels constituting the surfaces to be machined for the target workpiece, wherein
    performing machine learning and setting a machining condition for the voxels of the target workpiece further use the surface roughness as input.

4. The method according to claim 1, wherein the machining condition includes a tool to be used in machining.

5. A device for determining a machining condition in NC machining, the device comprising:
    a processor, and
    a display unit, wherein
    the processor is configured so as to execute:
    converting shape data of each of a plurality of known workpieces each having a plurality of machined surfaces into a plurality of voxels,
    setting a machining condition for each of the voxels constituting the machined surfaces for each of the plurality of known workpieces, wherein a plurality of machining conditions, including tool path patterns, are set for each of the voxels which belong to a plurality of the machined surfaces,
    performing machine learning using the voxels of the plurality of known workpieces and the machining condition in which the input is the voxels and the output is the machining condition,
    converting shape data of a target workpiece having a plurality of surfaces to be machined to a plurality of voxels,
    setting a machining condition for each of the voxels constituting the surfaces to be machined of the target workpiece using the voxels of the target workpiece as input based on results of the machine learning, wherein a plurality of machining conditions, including tool path patterns, are set for each of the voxels which belong to a plurality of surfaces to be machined, and
    determining a machining condition for each of the surfaces to be machined of the target workpiece by determining one having the largest number of occurrences among the machining conditions set for the voxels included in each surface to be machined as the machining condition of the surface to be machined,
    wherein each of the machining conditions is assigned a predetermined feature that allows an operator to identify it visually,
    the processor recognizes the machining conditions as the predetermined features, and
    the display unit displays each of the surfaces to be machined of the target workpiece together with the predetermined features corresponding to the determined machining conditions.

* * * * *